United States Patent [19]
Miller, III

[11] B 3,985,655
[45] Oct. 12, 1976

[54] DIALYZER COIL WITH POROUS SUPPORT FOR MEMBRANE

[75] Inventor: Frederick W. Miller, III, Glenmore, Pa.

[73] Assignee: Extracorporeal Medical Specialties Inc., King of Prussia, Pa.

[22] Filed: May 16, 1974

[21] Appl. No.: 470,601

[44] Published under the second Trial Voluntary Protest Program on March 9, 1976 as document No. B 470,601.

[52] U.S. Cl. .......................... 210/321 A; 210/494 M
[51] Int. Cl.² ......................................... B01D 31/00
[58] Field of Search ............... 210/494, 321, 500 M

[56] References Cited
UNITED STATES PATENTS

| | | | |
|---|---|---|---|
| 3,077,268 | 2/1963 | Gobel et al. | 210/494 X |
| 3,357,565 | 12/1967 | Burger | 210/494 X |
| 3,712,474 | 1/1973 | Martinez | 210/494 X |
| 3,724,673 | 4/1973 | Ryon | 210/500 M |
| 3,738,813 | 6/1973 | Esmund | 210/494 X |

Primary Examiner—Frank A. Spear, Jr.
Attorney, Agent, or Firm—Connolly and Hutz

[57] ABSTRACT

An extracorporeal, disposable, low-prime dialyzer coil for use in a variety of artificial kidney systems which includes a length of porous material supporting the tube of membrane material in a generally flattened and rolled up configuration. The length of porous material has an average thickness along its edge portions which is no greater than the average thickness along its mid-portion, and has an embossed configuration on one side while the other side is relatively smooth. The porous material is rigidized thermoplastic or thermosetting material, composed for instance of sintered granules or foamed open cells, with a majority of the pores or openings communicating with the surface to insure full dialysate flow against the membrane material. The porous support material is useful in a wide variety of coil designs, including coils adapted for operation with recirculating artificial kidney systems, with non-recirculating systems, or with systems combining recirculation with fresh dialysate addition.

9 Claims, 9 Drawing Figures

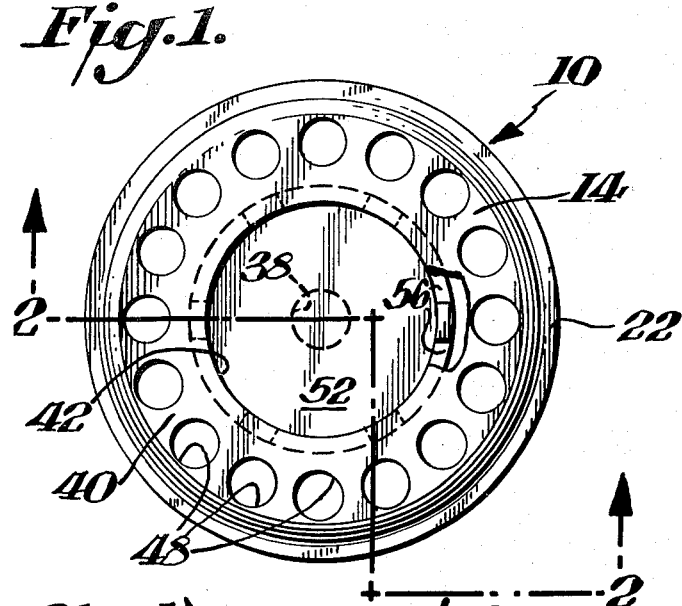
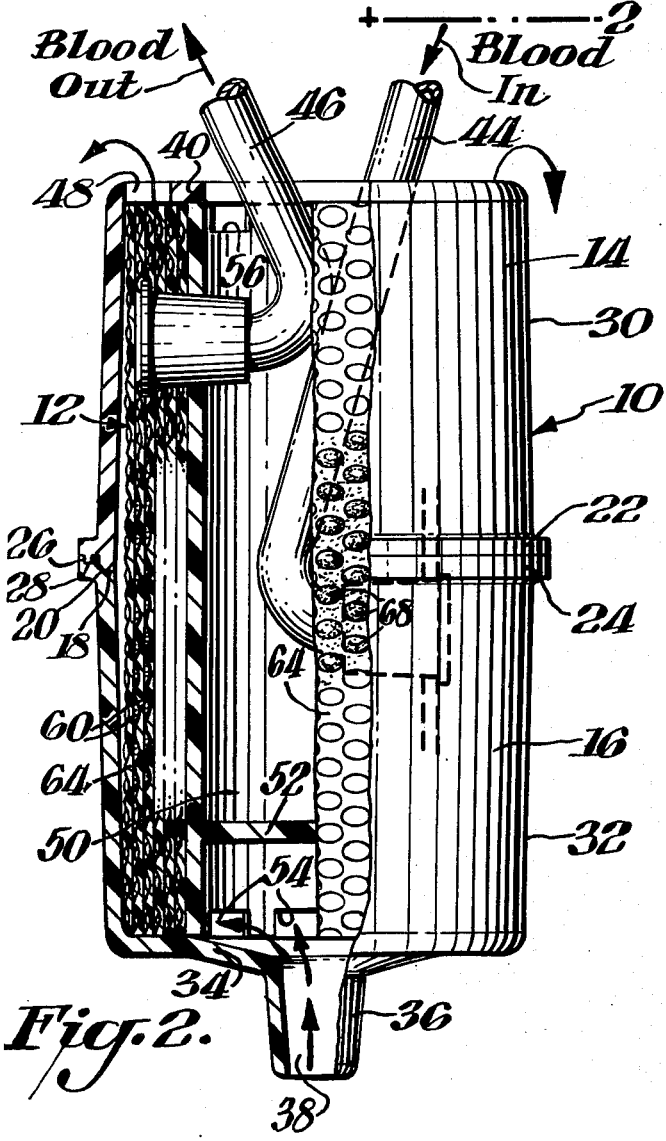
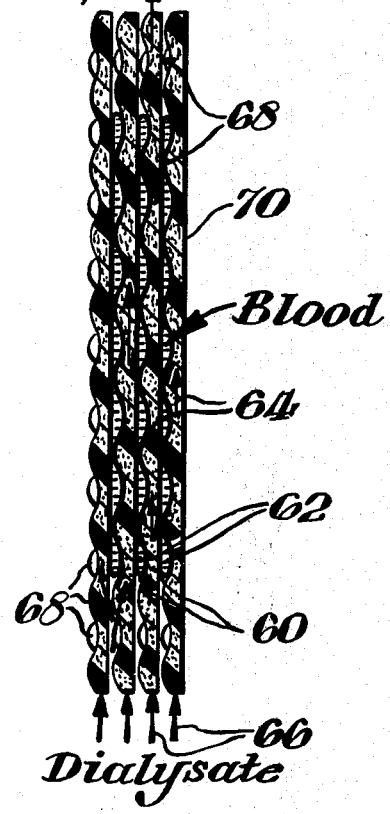
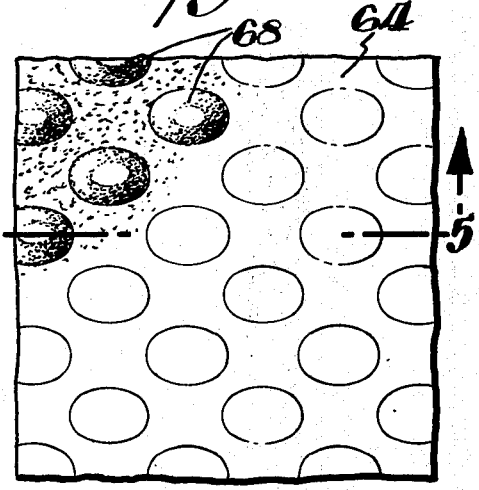
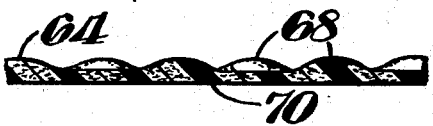

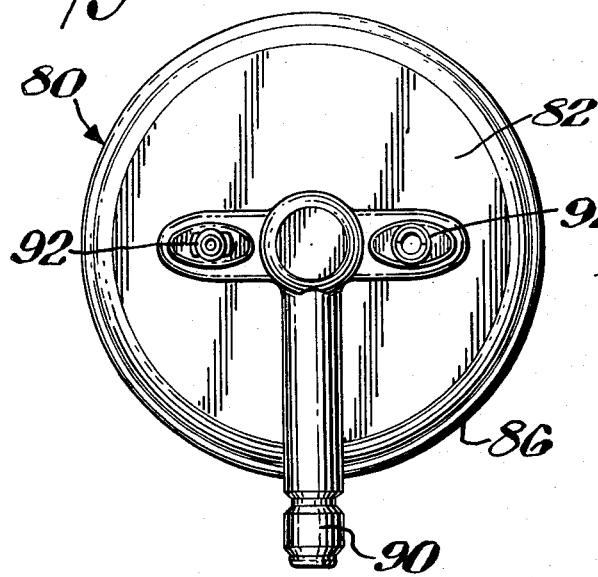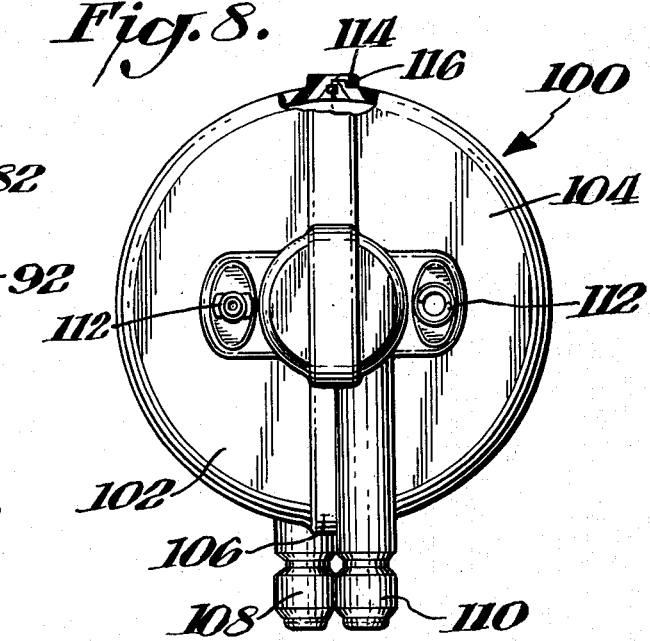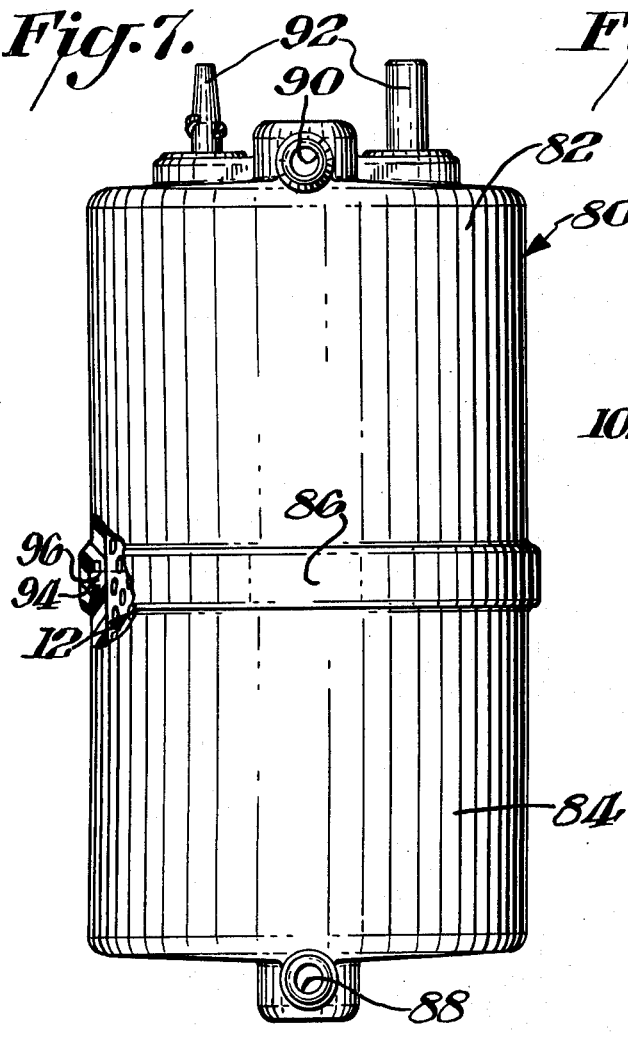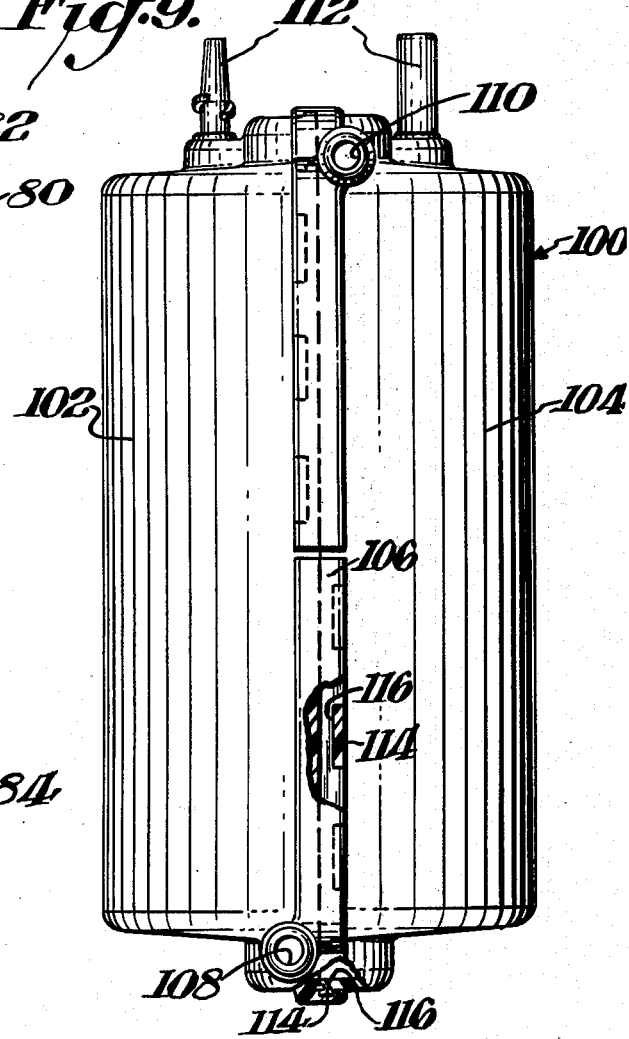

DIALYZER COIL WITH POROUS SUPPORT FOR MEMBRANE

BACKGROUND OF THE INVENTION

The invention relates to dialyzer coils useful in artificial kidney machines, and more particularly to an improved support for the membrane material to insure the desired turbulent flow characteristics for the dialysate and the provision of a preferred flattened configuration for the blood flow channel between adjacent layers of membrane material.

Prior to the present invention, dialyzer coils for artificial kidney machines have evolved through several stages of improvement, each to the benefit of patients suffering from acute or chronic renal failure. Early coils using an over-and-under woven mesh material as a support for the tubular membranes are disclosed in Metz U.S. Pat. No. 2,880,501 (1959) and Broman U.S. Pat. No. 2,969,150 (1961). Gobel U.S. Pat. No. 3,077,268 (1963) discloses the use of a hobnail configuration on both sides of impervious support material, rather than woven plastic mesh, and this support can be located either inside or outside the flattened tube of membrane material.

A significant improvement in dialyzer coil design was brought about by the use of a particular non-woven plastic netting disclosed by Kolobow in "A New Dynamic Disposable Artificial Kidney," *Transactions, American Society for Artificial Internal Organs*, Volume X, pages 116–120 (1964), and *Proceedings, Conference on Hemodialysis*, (Nov. 9–10, 1964) National Institute of Health, Bethesda, Maryland, pages 87–94. The same non-woven plastic netting is disclosed as being useful in a multiple-start-spiral design of dialyzer coil in Hoeltzenbein U.S. Pat. No. Re 27,510 (1972), a preferred orientation for the non-woven strands of the Kolobow netting is disclosed in Miller U.S. Pat. No. 3,508,662 (1970), and a particular cross-sectional shape for such strands is disclosed in Martinez U.S. Pat. No. 3,709,367 (1973).

The use of non-woven netting was responsible for many advantages in the performance and operation of dialyzer coils, not the least of which was a substantial reduction in the cost per unit because it facilitated commercial manufacturing procedures, including the elimination of edge spacers. Certain problems, however, were not solved by the use of non-woven netting, and others were created by its use. Problems in the former category include unwashed areas where the strands of netting contact the membrane, preventing 100% utilization of the available membrane area. In the latter category, the use of non-woven netting may cause manufacturing difficulties because the delicate membrane material is subject to puncture and tearing by the exposed ends of the plastic strands along each edge of the support material. In addition, the use of non-woven netting defines diagonally crossing chambers or pouches in the blood flow passage as the membrane distends under pressure, which militates against the ideal of a uniformly thin blood passage in which as great a percentage as possible of the blood is in contact with a membrane wall during passage through the dialyzer coil. Such distention under pressure requires the use of netting sufficiently thick to prevent blockage of the dialysate flow by the distended membrane, and the thicker the netting the greater the maximum blood volume and change therein as the flow and/or pressure is varied.

In 1971, Frost of the Department of Mechanical Engineering at the University of Newcastle Upon Tyne made reference to the use of a flat mat of porous nickel foam by Babb et al, "Clinical Experience With the Babb-Grimsrud High Efficiency Dialyzer," Proceed. Europ. Dialysis and Transplant Association, 4, p. 114–120, published by Excerpta Medica (1967). But the nickel material proved unsatisfactory, and thickened edge portions were deemed necessary for spacing purposes because all surfaces were relatively smooth without embossments.

Thus, the problem heretofore unsolved by the prior art is a dialyzer coil which is inexpensive and virtually foolproof in manufacture, which mandates a uniformly thin passage for blood between adjacent membrane walls by restricting undesireable distention thereof, and which directs dialysate to wash against the opposite sides of the membrane walls with the required turbulent flow and with a minimum of unexposed areas.

SUMMARY OF THE INVENTION

This invention provides a dialyzer coil for use in artificial kidney machines wherein a length of porous plastic material supports an elongated tube of membrane material in a flattened and rolled up configuration. The length of porous material does not require spacers along its top and bottom edges, and has an average thickness along its edge portions which is no greater than the average thickness along its mid-portion. The porous material has an embossed configuration on one side which establishes excellent blood flow characteristics which avoid many of the problems encountered with the use of non-woven plastic netting as a support material. The porous material with its embossed configuration controls membrane distention within desired limits without restricting the flow of dialysate. The porous material, which may be for instance either a sintered or a foamed thermoplastic or thermosetting material, has an apparent density such that a majority of the pores or openings communicate with the surface either on the embossed side or the relatively smooth side, to insure complete washing of the membrane material by the dialysate, with little if any dead areas, and with the required turbulence to insure that fresh dialysate constantly washes the membrane material to effectuate high efficiency transfer of impurities from the blood through the membrane. The porous material of this invention is useful with a wide variety of dialyzer coils for different types of artificial kidney systems.

BRIEF DESCRIPTION OF THE DRAWINGS

Numerous advantages of the present invention will become apparent to one skilled in the art from a reading of the detailed description in conjunction with the accompanying drawings wherein similar reference characters refer to similar parts, and in which:

FIG. 1 is a top plan view, with parts broken away, of a dialyzer coil of the open-ended variety;

FIG. 2 is a sectional elevational view on line 2—2 of FIG. 1 showing certain details of the construction, including the porous support material;

FIG. 3 is a greatly enlarged fragmentary sectional elevational view showing the relationship of the porous support material and the flattened tube of membrane material;

FIG. 4 is an enlarged view of a fragment of the porous support material showing one embossment pattern;

FIG. 5 is a sectional view on line 5—5 of FIG. 4 showing the depth of embossed configuration on one side and the relatively smooth surface on the other side of the porous support material;

FIG. 6 is a plan view of a dialyzer coil of the fully enclosed variety;

FIG. 7 is an elevational view of the dialyzer coil of the fully enclosed variety; and, FIG. 7 is an elevational view of the dialyzer coil of FIG. 6 showing the lateral joint between the two halves of the casing;

FIG. 8 is a plan view of another dialyzer coil of the fully enclosed variety; and, FIG. 9 is an elevational view of the dialyzer coil of FIG. 8 showing the longitudinal joint between the two halves of the casing.

DETAILED DESCRIPTION

Referring in more particularity to the drawings, the essential features of the present invention are useful with a wide variety of dialyzer coils for different types of artificial kidney systems. Three representative coil types are disclosed, each of which utilizes a rigid casing, although the invention may be used with coils having flexible casings such as the one disclosed in the aforesaid Miller U.S. Pat. No. 3,508,662. The rigid casing for the coil illustrated in FIGS. 1 and 2 is described in Miller U.S. Pat. No. 3,853,769 (1974).

This coil includes a rigid casing 10 housing the dialyzer coil 12, which includes a rigid upper end cap 14 and a rigid lower end cap 16. The rim portion 18 of the upper end cap and the rim portion 20 of the lower end cap are proportioned for mating engagement with each other. The rim portion 18 of the upper end cap includes an outwardly extending flange 22 therearound, and the rim portion 20 of the lower end cap also includes an outwardly extending flange 24 therearound. The flanges 22, 24 provide added strength to resist distortion from laterally applied forces. The flanges include mating configurations such as an annular ridge 26 on the flange 22 and an annular groove 28 on the flange 24 for effectuating a seal to join the end caps together at their rim portions.

Both the upper end cap 14 and the lower end cap 16 have sidewall portions 30 and 32, respectively, which taper slightly inwardly from their rim portions to their base portions. The sidewalls 30 and 32 are actually conical, although the taper is so slight as to give the appearance of generally cylindrical walls.

The base portion 34 of the lower end cap 16 is solid and fluid-tight, but is has an outwardly extending central flange 36 with an opening 38 therethrough. The flange 36 is tapered and adapted for engagement with a dialysis inflow opening of an artificial kidney machine without the use of O-rings or other means to effectuate fluid-tight seals.

The base portion 40 of the upper end cap 14 has a large central aperture 42 to permit outflow of dialyzing fluid and to provide access for blood inlet tubing 44 and blood outlet tubing 46. The base portion 40 also has a plurality of smaller dialysis outflow apertures 48 spaced in a circle around the large central aperture 42.

The end caps 14 and 16 which comprise the rigid casing may be made of any suitable material which has the requisite strength characteristics and which may be sterilized. In the preferred embodiment, the end caps are made of clear, transparent styrene, which permits a view of the dialyzer coil contained within the rigid casing. The end caps may be sealed together at their rim portions by any suitable means, depending upon the material from which they are made. If they are made of plastic material, then the seal may be effected by heat, solvent, mechanical fit, or well-known means. In the preferred embodiment, the configurations 26 and 28 are particularly adapted for sealing together by means of ultrasonic welding techniques.

The rigid casing is useful in combination with a dialyzer coil 12, which includes a cylindrical inner core member 50. The inner core member includes a lateral baffle 52 for the purpose of preventing dialyzing fluid from flowing through the central core and forcing the fluid to flow outside the inner core after the well-known fashion. The length of the inner core member is slightly less than the distance between the inside of the base portions 34, 40 of the end caps, such that the inner core member does not interfere with the operation which seals the rim portions of the end caps together. The inner core member 50 has dialysis inflow castellations 54 around its lower end below the baffle wall 52 to permit dialyzing fluid to flow from the lower inlet 38 to the dialyzer coil itself. The inner core member also has dialysis outflow castellations 56 around its upper end to permit dialyzing fluid to flow out of the dialyzer coil through the large central aperture 42, as well as through the small outflow apertures 48.

Wrapped around the inner tubular core 50 is the aforementioned coil means which includes a singular tubular membrane 60 providing a passage 62 which is a relatively long, spirally directed one, linear in cross-section, connected at one end to the blood inlet tubing 44 and at the other end to the blood outlet tubing 46, and which also includes a single layer of membrane support material 64 spirally wrapped in sandwiched relationship to the tubular membrane 60 and providing a passage as at arrows 66 which is a relatively short, axially directed one, spiral in cross-section, for flow of dialyzing fluid from the lower end of the coil means to the upper end thereof. The membrane support material 64 has a width which is greater than half the girth of the tubular membrane 60, so that a radial aperture may be provided through the wraps of support material which extend upwardly above the zone which contains the membrane 60 to receive the adapter plug for the blood outlet tubing 46. This general construction is explained in more detail in the aforesaid Miller U.S. Pat. No. 3,508,662.

The length of porous material 64 supporting the tube of membrane material has an average thickness along its edge portions which is no greater than the average thickness along its mid-portion, and has an embossed configuration 68 on one side thereof while the other side 70 is relatively smooth. The porous material is rigidized thermoplastic or thermosetting material, composed for instance of sintered granules or foamed open cells. A majority of the pores or openings communicate with the surface either on the side of the embossments 68 or the relatively smooth side 70, to insure complete washing of the membrane material by the dialysate, with little if any dead areas and with the required turbulence to insure that fresh dialysate constantly washes the membrane material to effectuate high efficiency transfer of impurities from the blood through the membrane.

The embossed configuration 68 on one side of the porous material 64 illustrated in the drawings comprises a series of convex protuberances of generally ovoid appearance which account for no more than about half the total thickness of the porous material. The recessed valley portions between the protuberances thus lie at a depth measured from the crests of the protuberances which is less than half the total thickness of the material. Other configurations and arrangements of embossments are contemplated within the scope of the present invention. Similarly useful is porous material with an embossed configuration essentially opposite to that illustrated — namely, a series of convex depressions spaced across the face of the material with a depth of up to about one-half of the total thickness of the material.

When the aforesaid porous material is spirally wrapped around the core with the flattened tube of membrane material, the blood within the tubular membrane expands its walls into contact with the adjacent wraps of support material, one membrane wall contacting the relatively smooth surface of one wrap and the other membrane wall contacting the embossed surface of the other wrap. This provides a generally flattened blood passage having its average thickness defined by the height and spacing of the embossments. A blood flow path of this configuration thus insures that all the blood will come in close contact with a membrane wall at numerous points during its passage through the coil, without objectionably thick pouches or flow channels which permit blood to pass through the coil without adequate contact with a membrane wall.

As noted above, the coil 12 including the porous material 64 may be used in a wide variety of coil designs, including coils adapted for operation with fully recirculating artificial kidney systems, with non-recirculating systems, or with systems combining recirculation with fresh dialysate additions. FIGS. 6 through 9 illustrate two versions of a rigid casing of the so-called totally enclosed variety presently found useful with non-recirculating artificial kidney systems.

The unit 80 illustrated in FIGS. 6 and 7 comprises a rigid casing consisting of an upper cup-shaped portion 82 and a lower cup-shaped portion 84 joined together at a lateral joint 86. The lower portion 84 includes a dialysate inlet port 88, and the upper portion 82 includes a dialysate outlet port 90. The upper portion 82 also includes inlet and outlet fittings 92 for connection with tubing for communication with the circulatory system of a patient. The lateral joint 86 between the upper and lower portions may utilize a protrusion 94 and recess 96 arrangement for snap locking the portions together.

The unit 100 illustrated in FIGS. 8 and 9 comprises a rigid casing consisting of a first trough-shaped portion 102 and a second trough-shaped portion 104 joined together at a longitudinal joint 106. The lower part of the portion 102 includes a dialysate inlet port 108, and the upper part of the portion 104 includes a dialysate outlet port 110. The upper part thereof also includes inlet and outlet fittings 112 for connection with tubing for communication with the circulatory system of a patient. The lateral joint 106 between the two halves may utilize a protrusion 114 and recess 116 arrangement for snap locking the portions together.

While the above described embodiments constitute the presently preferred mode of practicing this invention, other embodiments and equivalents are included within the scope of the actual invention, which is claimed as:

1. A dialyzer coil for use in artificial kidney machines comprising an elongated tube of membrane material, a length of porous material supporting the tube of membrane material in a generally flattened and rolled up configuration to define a first passage inside the tube of membrane material which is a relatively long, spirally directed one, linear in cross-section, and a second passage outside the tube of membrane material which is a relatively short, axially directed one, spiral in cross-section, the length of porous material occupying one of the passages between two adjacent layers of membrane material to provide turbulent flow for dialysate, the other passage between two adjacent layers of membrane material being free of obstructions to provide smooth flow for blood, means for connecting each end of the dialysate flow passage with the dialysis system of an artificial kidney machine, means for connecting each end of the blood flow passage with tubing for communication with the circulatory system of a patient, the porous material being selected from the group consisting of rigidized thermoplastic or thermosetting materials composed of sintered granules or foamed open cells, the majority of the pores communicating with the surface on each side of the porous material being sufficiently small that the membrane material under normal operating pressures does not distend into individual pores whereby the material between the pores controls the membrane distention to conform with the overall surface shape of the porous material, the length of porous material having an average thickness along its edge portions which is no greater than the average thickness along its mid-portion, and having an embossed configuration substantially covering one side thereof to define the blood flow passage.

2. A dialyzer coil as in claim 1 wherein the embossed configuration is on one side of the length of porous material and the other side thereof is relatively smooth, the embossed configuration consisting of a pattern of raised and relieved portions constituting up to about one-half the average thickness.

3. A dialyzer coil as in claim 2 wherein the length of porous material has the same average thickness across its width and throughout its length.

4. A dialyzer coil as in claim 3 wherein the first passage inside the tube of membrane material is the blood flow passage, and the second passage outside the tube of membrane material is the dialysate flow passage.

5. A dialyzer coil as in claim 4 wherein the tube of membrane material and length of support material are contained within a rigid plastic casing.

6. A dialyzer coil as in claim 5 wherein the means for connecting each end of the axially directed dialysate flow passage with the recirculating dialysate system of an artificial kidney machine comprises a tapered dialysate inflow fitting at one end of the rigid casing and a dialysate outflow aperture arrangement at the other end of the rigid casing.

7. A dialyzer coil as in claim 5 wherein the means for connecting each end of the axially directed dialysate flow passage with the single pass dialysate system of an artificial kidney machine comprises a dialysate inflow fitting and a dialysate outflow fitting on the rigid casing which otherwise totally encloses the dialyzer coil with the provision of the aforesaid means for connecting the spirally directed blood flow passage with tubing for communication with the circulatory system of a patient.

8. A dialyzer coil as in claim 7 wherein the dialysate inflow fitting and the dialysate outflow fitting are both located at one end of the rigid casing.

9. A dialyzer coil as in claim 8 wherein the rigid casing consists of at least two cooperating segments secured together at longitudinal joints to totally enclose the dialyzer coil.

* * * * *